(12) United States Patent
Yamada

(10) Patent No.: US 8,743,798 B2
(45) Date of Patent: Jun. 3, 2014

(54) DEVICE, SYSTEM, AND METHOD FOR ESTABLISHING WIRELESS COMMUNICATION BETWEEN LANS

(75) Inventor: Daisuke Yamada, Nagoya (JP)

(73) Assignee: Buffalo Inc., Nagoya (JP)

( * ) Notice: Subject to any disclaimer, the term of this patent is extended or adjusted under 35 U.S.C. 154(b) by 409 days.

(21) Appl. No.: 12/780,778

(22) Filed: May 14, 2010

(65) Prior Publication Data

US 2010/0290414 A1 Nov. 18, 2010

(30) Foreign Application Priority Data

May 18, 2009 (JP) ................................ 2009-120009

(51) Int. Cl.
*H04W 4/00* (2009.01)
(52) U.S. Cl.
USPC .......................................................... 370/329
(58) Field of Classification Search
USPC .............. 370/310, 310.2, 312, 313, 315, 328, 370/329, 331, 332, 334, 338, 341, 431, 433, 370/350, 437
See application file for complete search history.

(56) References Cited

U.S. PATENT DOCUMENTS

| | | | | |
|---|---|---|---|---|
| 6,870,815 B2 * | 3/2005 | McFarland et al. | ............ | 370/250 |
| 7,039,417 B2 * | 5/2006 | Lyle et al. | ................... | 455/452.2 |
| 7,206,840 B2 * | 4/2007 | Choi et al. | ..................... | 709/225 |
| 7,352,728 B2 * | 4/2008 | Soomro | ......................... | 370/338 |
| 8,023,468 B2 * | 9/2011 | Liu et al. | ........................ | 370/331 |
| 8,179,862 B2 * | 5/2012 | Kelly et al. | .................... | 370/332 |

FOREIGN PATENT DOCUMENTS

| | | |
|---|---|---|
| JP | 2000-236569 | 8/2000 |
| JP | 2001-285301 | 10/2001 |
| JP | 2003-249937 | 9/2003 |
| JP | 2004/535095 | 11/2004 |
| JP | 2005-223865 | 8/2005 |
| JP | 2005/303788 | 10/2005 |
| JP | 2009-100210 | 5/2009 |

OTHER PUBLICATIONS

Decision of Rejection dated Jun. 14, 2011 from Japanese Application No. 2009120009.
Notification of Reason for Rejection dated Mar. 22, 2011 from Japanese Application No. 2009-120009.

* cited by examiner

*Primary Examiner* — Anh Ngoc Nguyen
(74) *Attorney, Agent, or Firm* — Beyer Law Group LLP

(57) ABSTRACT

When radar/radio signals are detected by one of two access points establishing communication in a WDS mode, the one access point notifies the other access point of a change of a communication channel to a newly allocated channel and actually changes the communication channel to the newly allocated channel. The other access point notified of the newly allocated channel performs a passive scan at the notified newly allocated channel to detect a beacon broadcasted by the one access point. In response to detection of the beacon, the other access point resets the communication channel to the notified newly allocated channel. The two access points can accordingly reestablish communication in the WDS mode within a short time period. This arrangement allows for a quick channel change in response to detection of radar/radio signals, such as a weather radar, during communication of a 5 GHz frequency band in the WDS mode.

1 Claim, 6 Drawing Sheets

DEVICE, SYSTEM, AND METHOD FOR ESTABLISHING WIRELESS COMMUNICATION BETWEEN LANS

CROSS-REFERENCE TO RELATED APPLICATION

The present application claims priority from Japanese application P2009-120009A filed on May 18, 2009, the content of which is hereby incorporated by reference into this application.

BACKGROUND

1. Field of the Invention

The present invention relates to a wireless communication device and a wireless communication method.

2. Description of the Related Art

With improvement of the communication speed and the usability, wireless communication techniques have been used widely in various situations and locations, for example, in the houses, offices, and schools. Wireless communication devices have been proposed to have various functions including broadband router function as well as general access point function.

One of such functions is WDS (wireless distribution system) that establishes wireless data communication between at least two LANs. The WDS may be actualized by data transmission between access points included in respective wireless LANs or by an exclusive repeater device. In either way, the WDS technique assures data transmission to and from entities registered in advance and expands the physical coverage or the device coverage of wireless communication, thus enhancing the convenience of wireless communication. Such relaying function for the wireless LANs is described in, for example, Japanese Patent Laid-Open No. 2003-249937.

With advance of the wireless communication technology, there is a movement to extend the available range of carrier waves for wireless communication. This movement gives permission for the use of a 5 GHz frequency band, in addition to the conventionally used 2.4 GHz frequency band. In Japan, a frequency band of 5.25 to 5.35 GHz (corresponding to a W53 frequency band with four channels 52/56/60/64) was permitted for the indoor application in 2005. A W56 frequency band (5.4700~5.725 GHz) with eleven channels 100/104/108/112/116/120/124/128/132/136/140 was permitted for both the indoor application and the outdoor application in 2007.

The W53 and W56 frequency bands are generally used by various radars including moving radars, such as radars on boats and ships, aircraft radars, and radars for military purposes and stationary radars, such as weather radars. There is accordingly a possibility of interference with radio signals used by such equipment. For the purpose of adequate assignment, the wireless communication devices are obliged to avoid interference by DFS (dynamic frequency selection) technique. The DFS requirement monitors each channel for one minute prior to an actual use of the channel and gives permission for starting the actual use of the channel only after confirmation of no detection of radar/radio signals at the channel. The DFS requirement also monitors detection of radar/radio signals at a currently used channel and, in the event of detection of radar/radio signals, takes an adequate interference-avoiding operation, such as a prompt stop of the use of the channel within 10 seconds. Avoiding the interference by DFS is required in the countries such as China and Europe in which the use of the W53 or W56 frequency band is permitted.

In the state where a wireless communication device is used as a repeater device for interconnecting different wireless LANs, in response to detection of radar/radio signals at a currently used channel, the wireless communication device immediately stops the use of the currently used channel but can not reestablish communication at a newly allocated channel within a short time period. The wireless communication device is not informed of which channel is selected by the other end of communication and is thus required to successively perform scans at all available channels in order to identify the channel selected by the other end of communication.

SUMMARY

In order to solve at least part of the problem of the prior art discussed above, the present invention is accomplished by any of various aspects and applications discussed below.

A first aspect of the invention is directed to a wireless communication device of establishing wireless communication between at least two LANs. The wireless communication device has an interfering radio signal detection module configured to detect a radio signal causing interference at a currently used wireless communication channel. The wireless communication device also includes a channel change module configured to, in response to detection of the radio signal causing interference, change a channel used for wireless communication between the at least two LANs, from the currently used wireless communication channel to a newly allocated channel specified among multiple available channels, within a preset time period. The wireless communication device further includes a newly allocated channel notification module configured to notify the other end of communication of the newly allocated channel.

The wireless communication device according to the first aspect of the invention notifies the other end of communication of a newly allocated channel on the occasion of a channel change. This arrangement enables the other end of communication to readily identify the newly allocated channel. In the case of a channel change, communication can thus be reestablished within a short time period.

In one preferable application of the wireless communication device according to the first aspect of the invention, the newly allocated channel notification module notifies the other end of communication of one or multiple channels as the newly allocated channel, prior to an actual channel change.

In the wireless communication device of this application, the other end of communication is notified of one or multiple channels as the newly allocated channel, prior to an actual channel change. When the wireless communication device changes the channel used for wireless communication in response to detection of the radio signal causing interference, such as radar/radio signals, this arrangement enables the other end of communication to readily identify the newly allocated channel. The notification of multiple channels as the newly allocated channel assures easy reestablishment of communication even in the event of a further channel change in response to redetection of radar/radio signals at the newly allocated channel.

In another preferable application of the wireless communication device according to the first aspect of the invention, on every occasion of a channel change to a newly allocated channel, the newly allocated channel notification module notifies the other end of communication of the newly allocated channel.

In the wireless communication device of this application, the other end of communication is notified of a newly allocated channel on every occasion of a channel change. This arrangement enables the other end of communication to use the latest information and identify the newly allocated channel. The newly allocated channel may be sent to the other end of communication simultaneously with an actual channel change or prior to an actual channel change, for example, immediately before an actual channel change.

In one preferable embodiment of this application, the wireless communication device further includes a non-interference check module configured to, prior to a start of using the newly allocated channel for communication, perform a non-interference check operation and confirm absence of a radio signal causing interference at the newly allocated channel for a predetermined time period. On completion of the non-interference check operation performed by the non-interference check module, the newly allocated channel notification module utilizes the newly allocated channel itself to notify the other end of communication of the newly allocated channel at a time of changing the channel used for wireless communication to the newly allocated channel. During the non-interference check operation performed by the non-interference check module, the newly allocated channel notification module does not notify the other end of communication of the newly allocated channel at the time of changing the channel used for wireless communication to the newly allocated channel.

The wireless communication device of this embodiment performs the non-interference check operation to confirm the absence of a radio signal causing interference at the newly allocated channel, prior to a start of using the newly allocated channel for communication. This arrangement desirably prevents the use of the channel with the presence of the radio signal causing interference. When the non-interference check operation at the newly allocated channel is completed, the wireless communication device utilizes the newly allocated channel itself to notify the other end of communication of the newly allocated channel on the occasion of a channel change to the newly allocated channel. When the non-interference check operation at the newly allocated channel is not yet completed, on the other hand, the wireless communication device changes the channel used for wireless communication to the newly allocated channel without notification of the newly allocated channel to the other end of communication. When some radar already uses the newly allocated channel, the wireless communication device changes the communication channel again without establishing wireless communication. The wireless communication device of this arrangement can thus strictly meet the channel allocation requirement.

In one preferable embodiment of the invention, the wireless communication device broadcasts a beacon at the newly allocated channel after elapse of a preset period since an actual channel change and enables the other end of communication notified of the newly allocated channel to perform a passive scan and detect the wireless communication device.

The wireless communication device of this embodiment can readily reestablish wireless communication at the newly allocated channel after elapse of the preset time period since the actual channel change. The wireless communication device broadcasts the beacon at the newly allocated channel after elapse of the preset time period. This arrangement assures the confirmation period for non-interference of the radio signal specified as the requirement of the DFS process.

In the wireless communication device, the multiple available channels may include W53 and W56 specified in a 5 GHz band of a carrier wave frequency (5.470~5.725 GHz). The radio signal causing interference may be output from a moving radar or a stationary radar.

The wireless communication device of this arrangement meets the communication protocol of W53 and W56. Typical examples of the stationary radar include weather radars and radars in airports. Typical examples of the moving radar include radars for military purposes, radars on boats and ships, and aircraft radars.

In another preferable embodiment of the invention, the wireless communication device further has at least one function among a repeater function, a broadband router function, and a LAN access point function.

The wireless communication device of this embodiment can activate at least one of the repeater function, the broadband router function, and the LAN access point function, while avoiding interference with radars during wireless communication. The interference of the radio signal in the wireless communication device of such functions means temporary disconnection to the network environment for general users operating individual terminals. It is thus of great significance to reestablish communication at the newly allocated channel at the early stage.

A second aspect of the invention is also directed to a wireless communication system configured to include at least two wireless communication devices and establish wireless communication between at least two LANs with the at least two wireless communication devices.

The at least two wireless communication devices include one wireless communication device specified as one end of communication and the other wireless communication device specified as the other end of communication.

At least the one wireless communication device has: an interfering radio signal detection module configured to detect a radio signal causing interference at a currently used wireless communication channel; a channel change module configured to, in response to detection of the radio signal causing interference, change a channel used for wireless communication between the at least two LANs, from the currently used wireless communication channel to a newly allocated channel, within a preset time period; and a newly allocated channel notification module configured to notify the other wireless communication device specified as the other end of communication of the newly allocated channel.

At least the other wireless communication device has a search module configured to, in response to notification of the newly allocated channel by the one wireless communication device, perform a passive scan and detect a beacon output from the one wireless communication device specified as the one end of communication at the notified newly allocated channel.

The wireless communication system according to the second aspect of the invention assures communication between at least two wireless communication devices. When detecting a radio signal causing interference at a currently used wireless communication channel, one wireless communication device notifies the other wireless communication device of a newly allocated channel. The other wireless communication device notified of the newly allocated channel performs a passive scan to search for a beacon output from the one wireless communication device. This arrangement assures establishment of wireless communication at the newly allocated channel within a short time period.

In one preferable application of the wireless communication system according to the second aspect of the invention, when the passive scan fails to detect the beacon output from the one wireless communication device specified as the one end of communication, the search module of the other wireless communication device successively performs passive scans at all channels provided for wireless communication between the at least two LANs to search for the one wireless communication device specified as the one end of communication.

Even when a further channel change is required in response to redetection of a radio signal causing interference at the newly allocated channel, the wireless communication system of this application allows the other wireless communication device as the other end of communication to readily detect the one wireless communication device as the one end of communication.

A third aspect of the invention is further directed to a wireless communication method of establishing wireless communication between at least two LANs. The wireless communication method causes one end of communication to monitor detection of a radio signal causing interference at a currently used wireless communication channel. The wireless communication method also causes the one end of communication to, in response to detection of the radio signal causing interference, change a channel used for wireless communication between the at least two LANs, from the currently used wireless communication channel to a newly allocated channel, within a preset time period, and causes the one end of communication to notify the other end of communication of the newly allocated channel. The wireless communication method causes the other end of communication notified of the newly allocated channel to perform a passive scan at the notified newly allocated channel and detect a beacon broadcasted by the one end of communication.

The wireless communication method according to the third aspect of the invention causes one end of communication to notify the other end of communication of a newly allocated channel on the occasion of a channel change. This arrangement enables the other end of communication to readily identify the newly allocated channel. In the case of a channel change, communication can thus be reestablished within a short time period.

DESCRIPTION OF THE PREFERRED EMBODIMENTS

Figure 1:
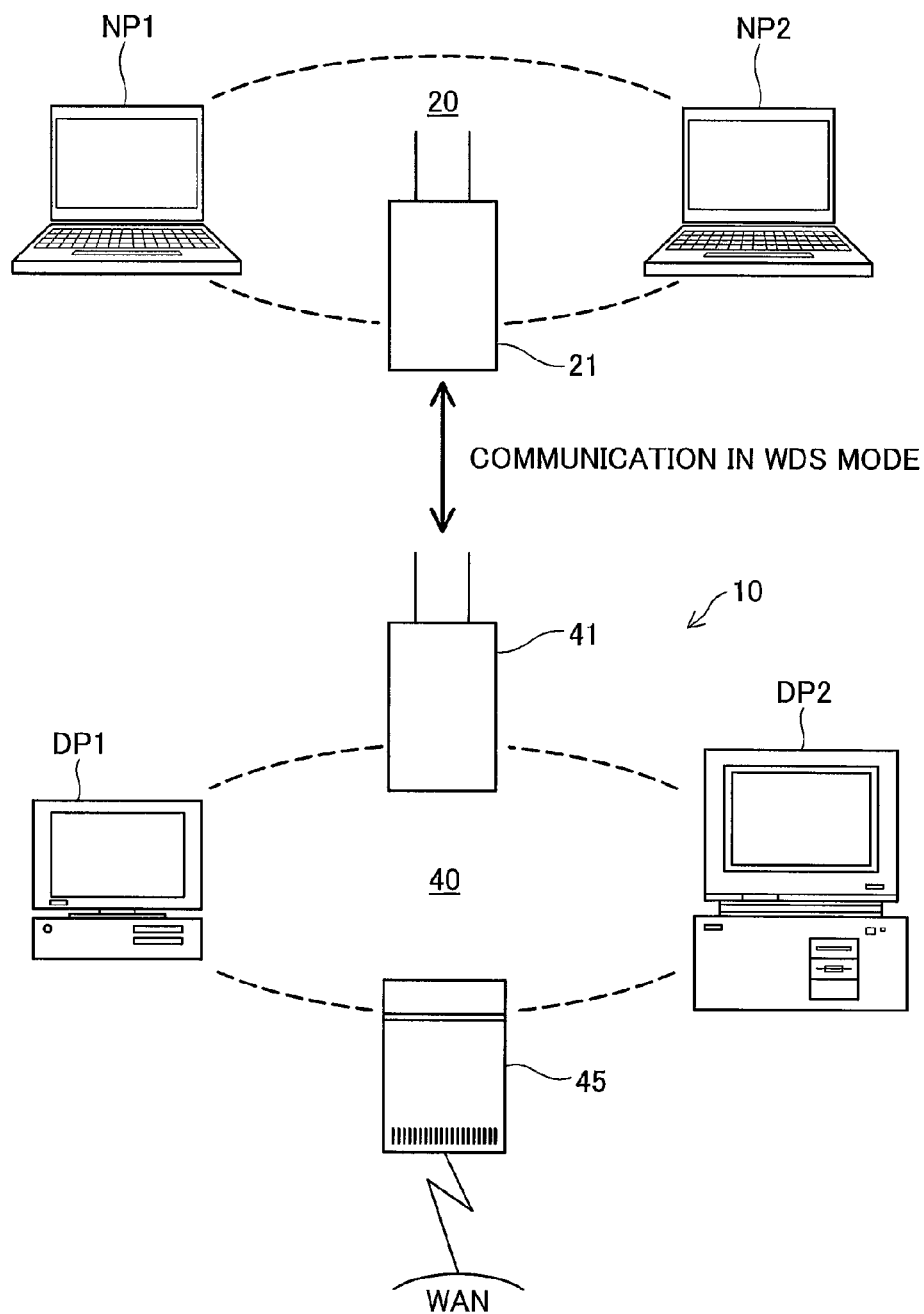
FIG. 1 is a diagrammatic representation of the configuration of a wireless LAN system in one embodiment according to the invention.

One mode of carrying out the invention is described below with reference to the accompanied drawings. FIG. 1 is a diagrammatic representation of the configuration of a wireless LAN system 10 in one embodiment according to the invention. As illustrated, this wireless LAN system 10 includes two wireless LANs 20 and 40. The respective wireless LANs 20 and 40 adopt different basic service sets and have access points 21 and 41 interconnected by inter-access point communication or wireless distribution system (WDS). The wireless LAN system 10 is connected to a WAN (wide area network: the Internet in this embodiment) via a broadband router 45 provided on the side of the wireless LAN 40. This connection enables all terminals belonging to the wireless LAN system 10 to access and utilize the Internet. In the configuration of this embodiment, the broadband router 45 is provided separately from the access point 41. One modified configuration may use one integral device designed to have both the functions of a broadband router and an access point. Another modification may adopt a configuration as an intranet without connection to the WAN. The wireless LANs 20 and 40 may partly be replaced by a wired LAN arrangement.

In the illustrated example of FIG. 1, two laptop computers NP1 and NP2 are connected to the wireless LAN 20, whereas two desktop computers DP1 and DP2 are connected to the wireless LAN 40. A communication protocol IEEE802.11n or IEEE802.11g (infrastructure mode) is adopted for wireless communication within each of the wireless LANs 20 and 40. This wireless communication has an effective frequency band of 2.4 GHz. A communication protocol IEEE802.11a is adopted, on the other hand, for inter-access point communication between the respective access points 21 and 41. The inter-access point communication has an effective frequency band of 5 GHz and uses W53 and W56.

Figure 2:
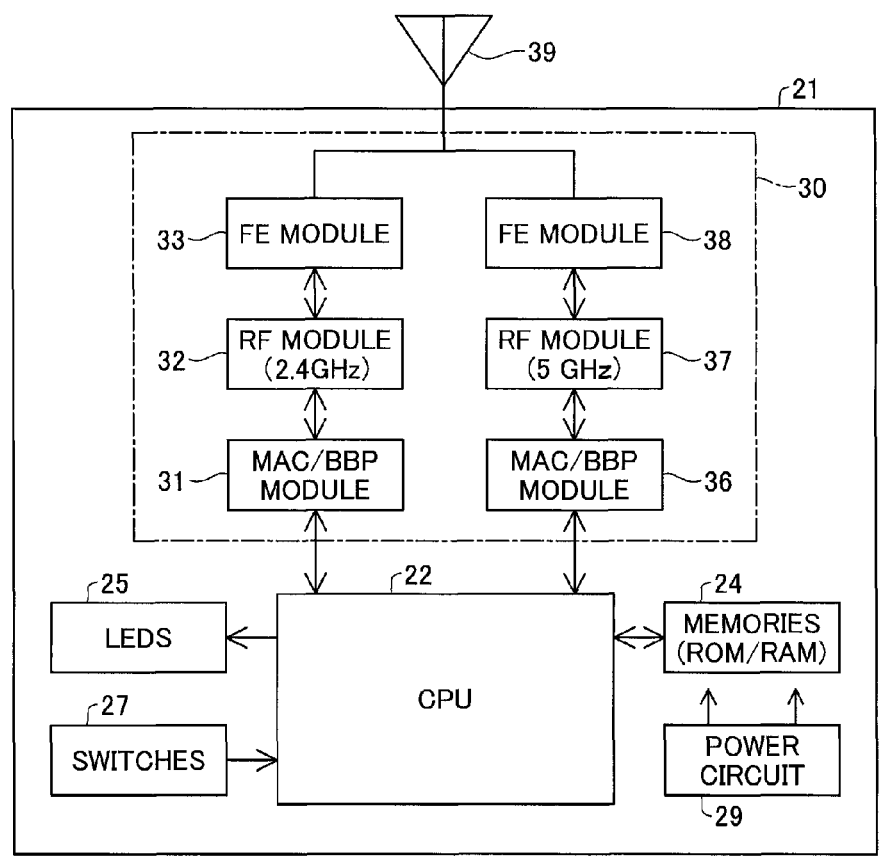
FIG. 2 is a block diagram showing the internal structure of access points 21 and 41 constructed as wireless communication devices in the embodiment.

The internal structure of the access points 21 and 41 establishing the inter-access point communication is described below. FIG. 2 is a block diagram showing the internal structure of the access point 21. Since the two access points 21 and 41 have substantially the same internal structures, the internal structure of the access point 41 is not specifically illustrated. As illustrated, the access point 21 includes a CPU 22 provided to control the overall operations of the access point 21, memories 24 arranged to store programs and relevant data therein, LEDs 25 structured to display the conditions of the access point 21, switches 27 operated to make various settings, a power circuit 29 arranged to allow for power supply, and a communication assembly 30 structured to perform various series of communication processing with regard to the wireless LAN. The CPU 22 has a built-in timer (not shown) used to determine whether a predetermined period has elapsed as discussed later.

The communication assembly 30 has two different systems, one system for communication of the 2.4 GHz frequency band and the other system for communication of the 5 GHz frequency band. The respective systems include MAC/BBP modules 31 and 36, RF modules 32 and 37, and FE modules 33 and 38. The FE modules 33 and 38 are connected to a common antenna 39. Each of the MAC/BBP modules 31 and 36 of the communication assembly 30 is constructed as a one-chip element including module sections of a media access controller (MAC) and of a baseband processor (BBP). The MAC module section is located at a lower level than a data link layer (second layer) and performs data transmission and reception in the unit of a frame of a predetermined format and error detection. The BBP module section is structured as a circuit to process signals before modulation or after demodulation (baseband signals). Namely the MAC/BBP modules 31 and 36 perform packetization of each signal as a communication object by adding a header, such as an MAC address, to the signal to generate communication data. The FE modules 33 and 38 use the common antenna 39 in the configuration of this embodiment, but may use individual antennas.

The RF modules 32 and 37 modulate data shaped and packetized for communication with carrier waves to generate transmission signals, while extracting data from received signals modulated in advance with carrier waves. The FE modules 33 and 38 are respectively located between the common antenna 39 and the RF modules 32 and 37 and are designed as front end modules performing adjustment of the reception sensitivity, adjustment of the transmission output, and changeover of the half-duplex signals. The respective modules are involved in communication processing in the individual communication systems of the respective frequency bands. The communication system of the 5 GHz frequency band processes ordinary communications and also works as the 'interfering radio signal detection module' to detect radio signals causing interference at a currently used wireless communication channel.

The access points 21 and 41 having the configuration discussed above use the communication system of the 2.4 GHz frequency band for the wireless communication in the infrastructure mode within each of the wireless LANs 20 and 40 (FIG. 1) according to the communication protocol of IEEE802.11n or IEEE802.11g. The access points 21 and 41 accordingly make communications with the terminals located in the respective wireless LANs 20 and 40. The communication system of the 5 GHz frequency band is used, on the other hand, for the inter-access point communication between the access points 21 and 41 in the WDS mode according to the communication protocol of IEEE802.11n or IEEE802.11a.

The following describes series of communication-related operations in the WDS mode performed by the CPUs 22 of the access points 21 and 41. Both the access points 21 and 41 are involved in the communication in the WDS mode. For the convenience of explanation, the access point 21 is assumed to start a DFS (dynamic frequency selection) process including detection of radar/radio signals and a channel change. The access point 21 and the CPU 22 included in the access point 21 may be hereafter referred to as 'change source access point 21 ' and 'change source CPU 22 '. The access point 41 is assumed to follow the channel change performed by the access point 21. The access point 41 and the CPU 22 included in the access point 41 may be hereafter referred to as 'follower access point 41 ' and 'follower CPU 22'.

Figure 3:
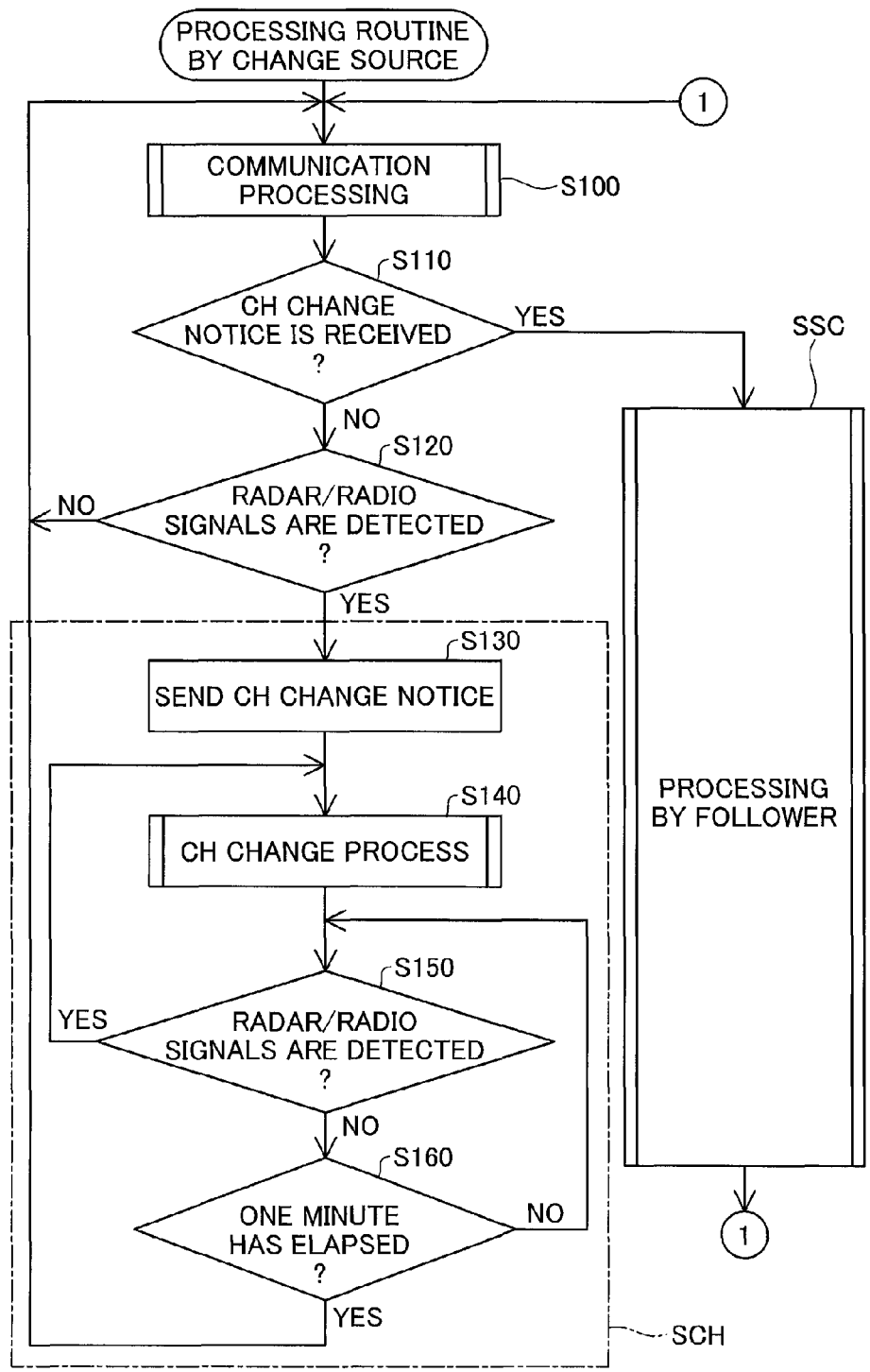
FIG. 3 is a flowchart showing a change source processing routine performed by the access point 21 specified as a change source wireless communication device in the embodiment.
Figure 4:
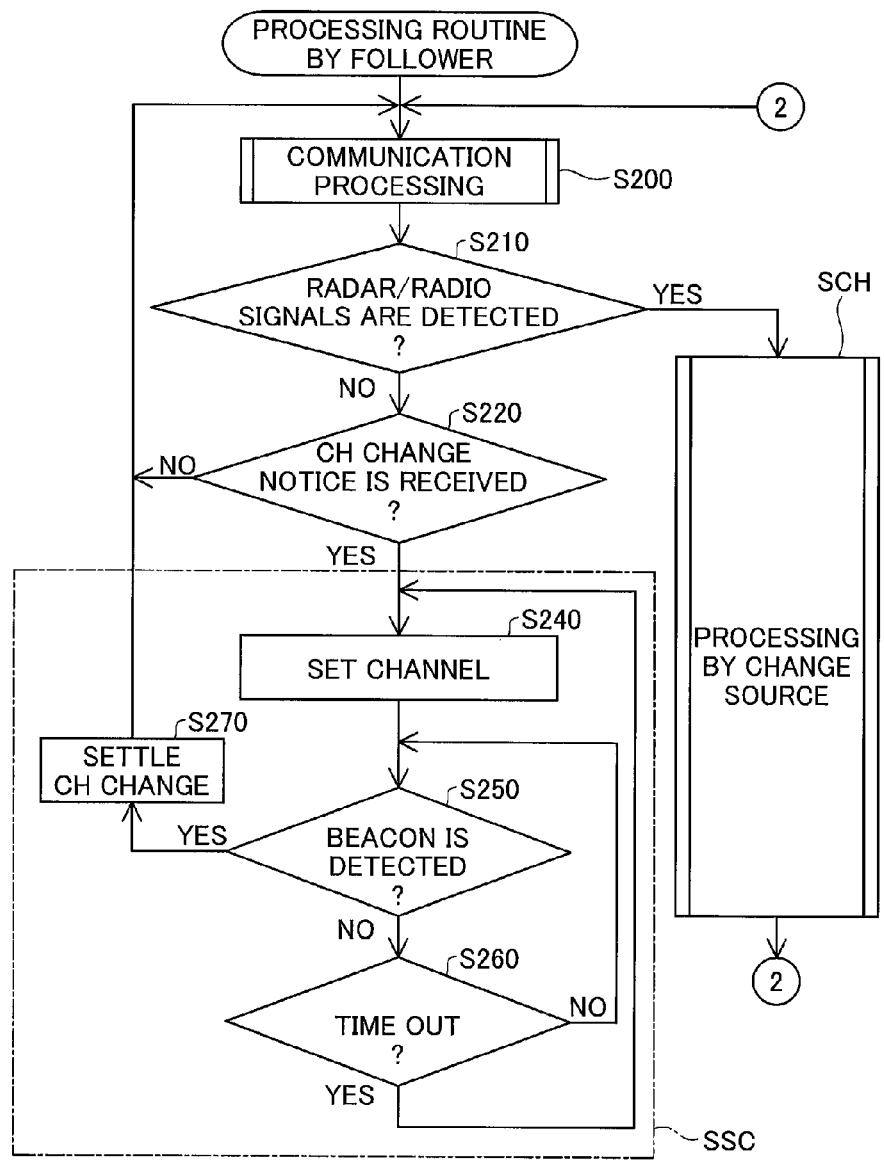
FIG. 4 is a flowchart showing a follower processing routine performed by the access point 41 specified as a follower wireless communication device in the embodiment.

FIG. 3 is a flowchart showing a change source processing routine performed by the change source CPU 22. FIG. 4 is a flowchart showing a follower processing routine performed by the follower CPU 22. The two access points 21 and 41 actually perform an identical series of processing. It is not determinable which access point detects radar/radio signals. Since the access point 21 may be specified as a follower, the flowchart of FIG. 3 includes processing by follower SSC. The processing by follower SSC corresponds to a series of processing of steps S220 through S260 in the follower processing routine of FIG. 4. Similarly processing by change source SCH included in the flowchart of FIG. 4 corresponds to a series of processing of steps S120 through S160 in the change source processing routine of FIG. 3. If the access point 41 detects radar/radio signals prior to the access point 21, the access point 41 is specified as a change source and performs the change source processing routine of FIG. 3.

The respective access points 21 and 41 mutually transmit data by communication in the WDS mode. In this state, the CPUs 22 of the respective access points 21 and 41 perform ordinary communication processing at step S100 in the flowchart of FIG. 3 and at step S200 in the flowchart of FIG. 4. The CPU 22 of the access point 21 determines whether a channel (CH) change notice is received (step S110) and whether radar/radio signals are detected (step S120), in parallel to the ordinary communication process (step S100). The channel change notice is sent from the access point on the other end of communication, that is, the access point 41, during the ordinary communication processing (step S100). The description here is on the assumption that the access point 21 on one end of communication detects radar/radio signals prior to the access point 41. A negative answer 'No' is thus given at step S110.

The change source CPU 22 subsequently determines whether radar/radio signals are detected (step S120). Detection of radar/radio signals is actually performed by the RF module 37 and the MAC/BBP module 36 in the communication system of the 5 GHz frequency band. The change source CPU 22 receives the result of detection and determines whether radar/radio signals are detected at step S120. When no radar/radio signals are detected (step S120: No), the CPU 22 returns the processing flow to the ordinary communication processing (step S100) and continues communication with the other access point 41 in the WDS mode.

In response to detection of radar/radio signals (step S120: Yes) in the course of continued communication, the change source CPU 22 sends a channel change notice to the other access point 41 (step S130). The channel change notice specifies a preset channel as a newly allocated channel used for communication by changing from a currently used communication channel. The access points 21 and 41 of this embodiment use four channels 52/56/60/64 of W53 and eleven channels 100/104/ . . . /140 of W56 as channels of the 5 GHz frequency band for indoor communication in the WDS mode. For effective avoidance of interference with the detected radar/radio signals, it is preferable to set a newly allocated channel having a frequency band significantly apart from the frequency band of the currently used communication channel. The change source CPU 22 accordingly sends a channel change notice specifying a newly allocated channel apart from the currently used communication channel by at least four channels. For example, when the currently used communication channel is a channel '100 ', a channel '64 ' may be specified as the newly allocated channel. A channel '116 ' or any farther channel may otherwise be specified as the newly allocated channel. The procedure of this embodiment specifies only one channel by the channel change notice. The channel change notice may specify plural channels with a priority order. For example, the channel change notice may specify '1: channel 64', '2: channel 100 ', and '3: channel 140 '. Here the numerals given as prefixes of the channels represent a priority order.

After sending the channel change notice (step S130), the change source CPU 22 perform a channel change process to actually change the channel (step S140). The channel change process includes not only processing to change the communication channel to the newly allocated channel specified in advance but additional processing to provide for a subsequent channel change. The channel change process will be described later in detail with concrete examples with reference to FIGS. 5 through 7. The channel change process (step S140) performed immediately after the channel change notice at step S130 changes the communication channel to the notified channel.

The change source CPU 22 subsequently determines whether radar/radio signals are detected (step S150). When no radar/radio signals are detected (step S150: No), the change source CPU 22 further determines whether one minute has elapsed since the channel change (step S160).

Until one minute has elapsed without detection of radar/radio signals, the change source CPU 22 returns the processing flow to step S150 to repeat this series of processing. When no radar/radio signals have been detected for one minute after the channel change process, the CPU 22 returns the processing flow to the ordinary communication processing (step S100). Monitoring detection of radar/radio signals for one minute aims to meet the requirement of the DFS.

In the event of redetection of radar/radio signals in one minute (step S150: Yes), the change source CPU 22 returns the processing flow to step S140 and performs the channel change process again to change the communication channel to still another channel. At this moment, communication with the other access point 41 has not yet been restarted, so that the change source CPU 22 simply performs the channel change process to change the communication channel (step S140) without sending a channel change notice specifying a further allocated channel (step S130). Subsequently the change source CPU 22 monitors detection of radar/radio signals for one minute (steps S150 and S160) and, in the case of no detection of radar/radio signals for one minute (step S150: No, step S160: yes), the CPU 22 returns the processing flow to the ordinary communication processing (step S100).

While the change source access point 21 performs this series of processing explained above, the follower access point 41 performs a series of processing shown in the flowchart of FIG. 4. The CPU 22 of the follower access point 41 determines whether radar/radio signals are detected (step S210) and whether a channel (CH) change notice is received (step S220), in parallel to the ordinary communication process (step S200). When the change source access point 21 on one end of communication sends a channel change notice (step S130: FIG. 3), the CPU 22 of the follower access point 41 on the other end of communication receives this channel change notice (step S220: Yes). The follower CPU 22 then proceeds to step S240 and subsequent steps.

After reception of the channel change notice at step S220, the follower CPU 22 sets a channel to a target of a passive scan (step S240). At this moment, the follower access point 41 has not yet actually changed the communication channel. The follower access point 41 then determines whether a beacon is detected at the set channel (step S250). This operation corresponds to a passive scan. Namely the passive scan is a process performed by one access point on one end of communication without establishment of a communication channel to detect a beacon broadcasted by another access point on the other end of communication and thereby detect the another access point on the other end of communication. Immediately after reception of the channel change notice, the follower access point 41 recognizes the newly allocated channel specified by the change source access point 21 on the one end of communication. The follower access point 41 then performs the passive scan at this newly allocated channel to detect a beacon broadcasted by the one end of communication. The change source access point 21 of changing the communication channel does not establish communication for one minute because of the requirement of the DFS process, so that the follower access point 41 cannot detect a beacon immediately. In the case of no detection of a beacon, the follower CPU 22 checks for a time-out (step S260) and repeats detection of a beacon until the time-out or elapse of a preset time period. Since the change source access point 21 does not make communication for one minute after the channel change, the time period for the time-out should be set to at least one minute. The time period for the time-out is set to 70 seconds in this embodiment but may arbitrarily be set according to the communication specification, such as the time requirement of the DFS process set on the change source access point 21. The follower access point 41 may alternatively receive the preset time period for the time-out together with the channel change notice specifying the newly allocated channel from the change source access point 21.

When the access point 21 on the one end of communication completes the DFS process and broadcasts a beacon before the time out, the follower CPU 22 on the other end of communication detects the beacon (step S250: Yes) and confirms that there is a channel usable for communication. The follower CPU 22 then settles the change of the communication channel (step S270) and returns the processing flow to the ordinary communication processing (step S200) to reestablish communication with the other access point 21. In the case of no detection of a beacon before the time out (step S250: No, step S260: Yes), on the other hand, the follower CPU 22 returns the processing flow to step S240 to set another channel as a new target of the passive scan and repeat the subsequent series of processing explained above.

Based on the processing flows performed by the two access points 21 and 41 as discussed above, concrete examples of channel change by the access points 21 and 41 establishing communication in the WDS mode are described below with reference to FIGS. 6 and 7. The detailed procedure of the channel change process performed at step S140 in FIG. 3 is also explained with reference to the flowchart of FIG. 5.

Figure 5:
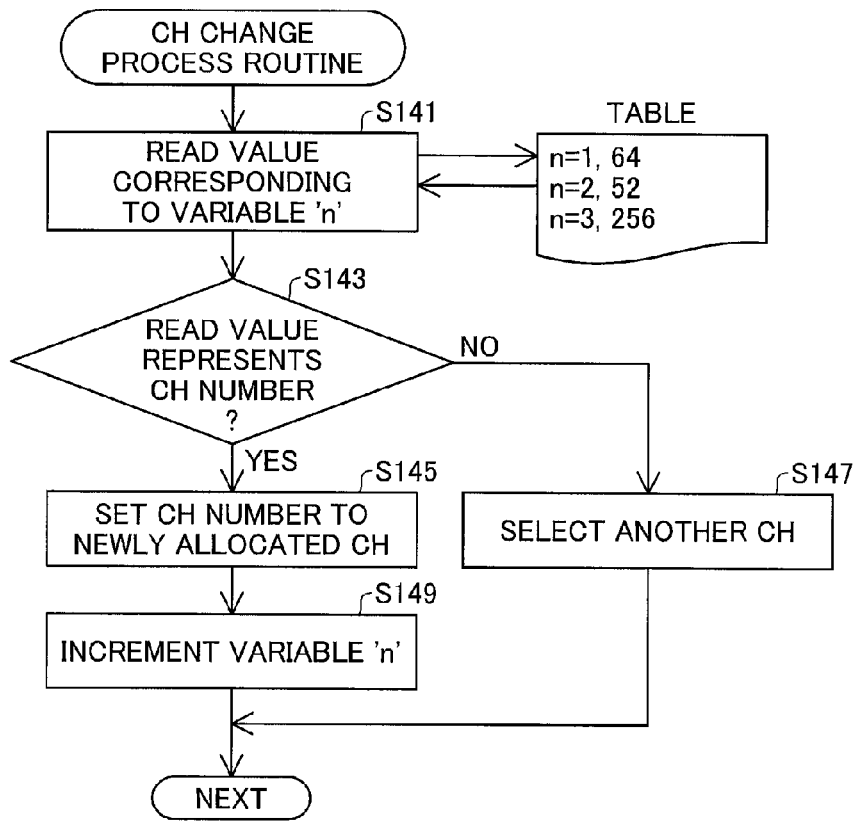
FIG. 5 is a flowchart showing the details of a channel change process performed at step S140 in the flowchart of FIG. 3.

It is assumed that the two access points 21 and 41 initially establish communication at a channel '100'. In this state, when the access point 21 detects radar/radio signals (step S120 in FIG. 3), the change source CPU 22 sends a channel change notice specifying a preset channel '64' as a newly allocated channel for communication to the other access point 41 (step S130) and performs the channel change process to actually change the communication channel to the newly allocated channel '64' (step S140). This is performed at a timing T1 shown in FIG. 6. The channel change process performed by the change source CPU 22 is shown in the flowchart of FIG. 5. The change source CPU 22 refers to a preset table with a variable 'n' initially set to an initial value '1' and reads a value corresponding to a current set value of the variable 'n' (step S141). When the read value corresponding to the current set value of the variable 'n' represents a channel number (step S143: Yes), the change source CPU 22 sets the channel number to the newly allocated channel (step S145). The change source CPU 22 subsequently increments the variable 'n' by 1 (step S149) and terminates the current cycle of the channel change process.

The channel change process of FIG. 5 refers to the preset table with the variable 'n', since 'n' channels are provided as possible candidates for the newly allocated channel in the case of detection of radar/radio signals. After a channel change in response to detection of radar/radio signals, radar/radio signals may be detected again at a newly allocated channel. As a measure against such a situation, 'n' channels (two channels in this embodiment) are provided as the possible candidates for the newly allocated channel. The table includes a value '256' (with setting '1' in all 8 bits) corresponding to the variable 'n' incremented to or above '3'. This design of the table facilitates a change in number of possible candidates for the newly allocated channel by simply changing the settings in the table.

When the read value corresponding to the current set value of the variable 'n' is '256' (step S143: No), the change source CPU 22 adequately selects one channel among remaining channels that have not yet been used for communication (step S147). A concrete procedure of this embodiment uses pseudorandom numbers to select a new channel. In this case, the change source CPU 22 terminates the current cycle of the channel change process without incrementing the variable 'n'.

For example, the change source CPU 22 refers to the table to read a value corresponding to the variable 'n'=1 and changes the communication channel from the initial channel '100' to the newly allocated channel '64' specified by the read value. In this state, the change source CPU 22 on the one end of communication notifies the follower access point 41 on the other end of communication of the newly allocated channel '64' in the form of the channel change notice (step S130 in FIG. 3). The follower access point 41 performs a passive scan to detect a beacon at the notified channel '64' (steps S240 and S250 in FIG. 4). After elapse of the preset time period for the DFS process, the follower access point 41 detects a beacon broadcasted by the change source access point 21 at a timing T2 (FIG. 6) and sets the notified channel '64' to the communication channel at a timing T3 (FIG. 6). The two access points 21 and 41 then reestablish communication in the WDS mode at the newly allocated channel '64' changed from the initial channel '100'.

After a change of the communication channel from the channel '100' to the newly allocated channel '64' in response to detection of radar/radio signals, the change source access point 21 may detect radar/radio signals again at the newly allocated channel '64' in the course of the DFS process. In the event of redetection of radar/radio signals (step S150 in FIG. 3), the change source CPU 22 performs the channel change process again (step S140). According to the concrete procedure of the channel change process, the change source CPU 22 refers to the preset table to read a value corresponding to the variable 'n'=2 (step S141 and S143 in FIG. 5) and changes the communication channel to another channel '52' specified by the read value (step S145) at a timing T4 (FIG. 7). The follower access point 41 fails to detect a beacon during the period of a first passive scan and has a 'time-out' error (steps S250 and S260 in FIG. 4) at a timing T5 (FIG. 7). The follower access point 41 then sets another search channel for a next passive scan (step S240). At this moment, the follower access point 41 is not notified of the channel allocated after the channel '64' to the communication channel by the change source access point 21. The follower access point 41 then successively sets a search channel for a passive scan from a smallest channel number among available channels at a timing T6 (FIG. 7). During the repeated passive scans with the successive channel changes, the follower access point 41 detects a beacon broadcasted by the change source access point 21 at a certain channel at a timing T7 (FIG. 7). The two access points 21 and 41 then reestablish communication in the WDS mode at the certain channel.

As described above, at the time of a change of the communication channel to a newly allocated channel, the change source access point 21 of detecting radar/radio signals notifies the follower access point 41 on the other end of communication of the newly allocated channel. This arrangement enables the two access points 21 and 41 to reestablish communication in the WDS mode within a short time period, thus preventing long-time discontinuation of communication between the two wireless LANs 20 and 40. This arrangement desirably prevents the wireless LAN 20 without the broadband router 45 for direct connection to the WAN from being disconnected from the WAN for a long time period.

According to the procedure of the embodiment, the channel change notice sent by the change source access point 21 specifies only one channel as the newly allocated channel (step S130 in FIG. 3). As mentioned previously, the channel change notice may specify plural channels with a priority order. When a further channel change is required in response to redetection of radar/radio signals after the channel change process (step S140 in FIG. 3), the CPU 22 of the follower access point 41 successively changes the search channel for the passive scan according to the priority order of the plural channels specified by the channel change notice. This modified arrangement also enables the two access points 21 and 41 to reestablish communication in the WDS mode within a short time period.

In the configuration of the embodiment discussed above, on every occasion of a change of the communication channel to a newly allocated channel, the change source access point 21 of detecting radar/radio signals notifies the follower access point 41 on the other end of communication of the newly allocated channel. In one modified configuration, the change source access point may notify the follower access point of the newly allocated channel, independently of detection of radar/radio signals. There are several possible timings for such notification:

(A) The follower access point may be notified of the newly allocated channel at preset intervals or at random timings during the ordinary communication in the WDS mode.

(B) The follower access point may be notified of the newly allocated channel at a start of communication in the WDS mode, for example, at each power-on time.

Figure 6:
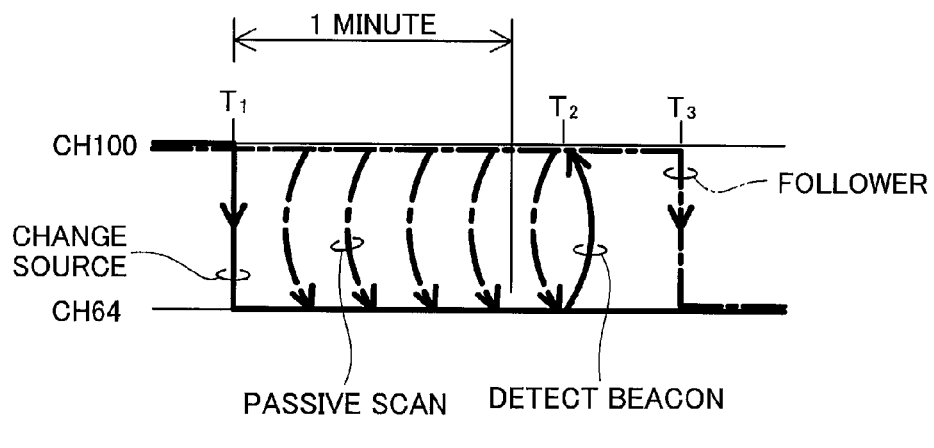
FIG. 6 is an explanatory diagram showing one example of channel change.
Figure 7:
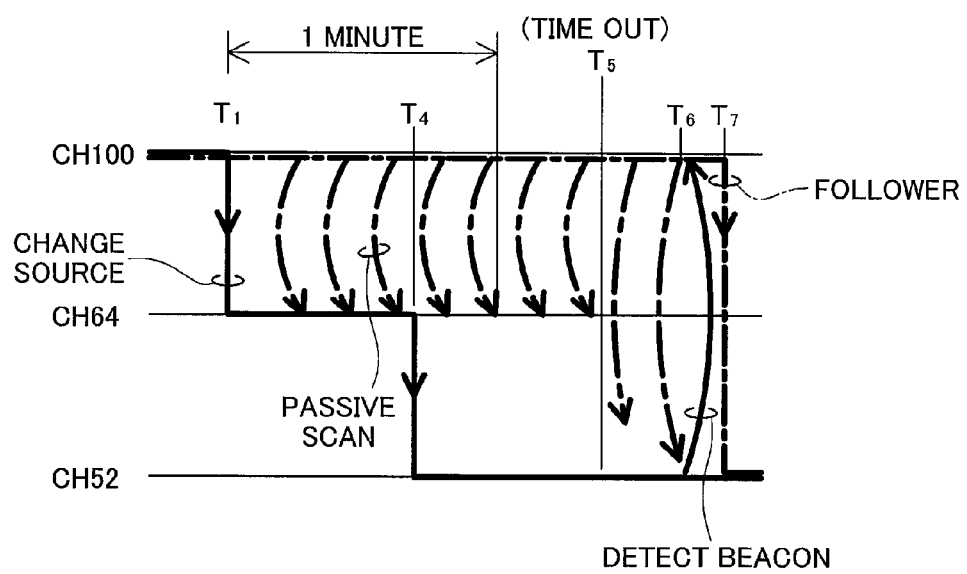
FIG. 7 is an explanatory diagram showing another example of channel change.

(C) The follower access point may be notified of the newly allocated channel when communication is reestablished in the WDS mode at the newly allocated channel (the timing T3 in FIG. 6 or the timing T7 in FIG. 7).

(D) The follower access point may be notified of the newly allocated channel when transmission of significant packets is interrupted for a predetermined time period during communication in the WDS mode.

In the configuration of the embodiment discussed above, the change source access point directly notifies the follower access point of the newly allocated channel. In one modified configuration, multiple channel change series may be specified in advance and stored in both the access points, and the change source access point notifies the follower access point of one channel change series selected among the multiple channel change series. For example, fifteen channel change series starting from respective fifteen channels (four channels for W53 and eleven channels for W56), such as a first channel change series of 100→64→52→120 and a second channel change series of 104→60→124→56, may be specified and stored in advance. As long as both the access points recognize a currently used channel change series of communication, individual notification of a newly allocated channel is not required. In this case, recognition of a currently used channel by both the access points is equivalent to notification of a newly allocated channel.

In another modified configuration, the change source access point of changing the communication channel may be structured to include additional circuits for monitoring the communication status at each set channel in the 5 GHz frequency band. This modified structure monitors detection of radar/radio signals at a potential allocated channel, prior to an actual channel change. In this case, another set of the MAC/BBP module 36, the RF module 37, and the FE module 38 is required as the additional circuits for communication in the 5 GHz frequency band. In parallel to communication in the WDS mode, the additional circuits work to confirm no detection of radar/radio signals at the potential allocated channel. Such confirmation is equivalent to completion of the DFS process. In response to detection of radar/radio signals during communication in the WDS mode, the communication channel is immediately changed to the monitored potential allocated channel. This modified arrangement enables the two access points 21 and 41 to keep the communication in the WDS mode even in the event of detection of radar/radio waves.

The embodiment and its modifications and applications discussed above are to be considered in all aspects as illustrative and not restrictive. There may be many other modifications, changes, and alterations without departing from the scope or spirit of the main characteristics of the present invention. For example, the technique of the invention is similarly applicable to communication among three or more access points or to communication in other frequency bands.

Among the various constituents and components included in the embodiment of the invention discussed above, those other than the constituents and components included in independent claims are additional and supplementary elements and may be omitted according to the requirements. The scope of the invention is indicated by the appended claims rather than by the foregoing description. All changes that come within the meaning and range of equivalency of the claims are to be embraced within their scope.

What is claimed is:

1. A wireless communication device used to establish wireless communication between at least two LANs, the wireless communication device comprising:
   an interfering radio signal detection module configured to detect a radio signal causing interference at a currently used wireless communication channel;
   a channel change module configured to, in response to detection of the radio signal causing interference, change a channel used for wireless communication between the at least two LANs, from the currently used wireless communication channel to a newly allocated channel specified among multiple available channels, within a preset time period;
   a newly allocated channel notification module configured to notify the other end of communication of the newly allocated channel; and
   a non-interference check module configured to, prior to a start of using the newly allocated channel for communication, perform a non-interference check operation and confirm absence of a radio signal causing interference at the newly allocated channel for a predetermined time period,
   wherein on every occasion of a channel change to a newly allocated channel, the newly allocated channel notification module notifies the other end of communication of the newly allocated channel,
   wherein on completion of the non-interference check operation performed by the non-interference check module, the newly allocated channel notification module utilizes the newly allocated channel itself to notify the other end of communication of the newly allocated channel at a time of changing the channel used for wireless communication to the newly allocated channel, and
   during the non-interference check operation performed by the non-interference check module, the newly allocated channel notification module does not notify the other end of communication of the newly allocated channel at the time of changing the channel used for wireless communication to the newly allocated channel.

* * * * *